Jan. 5, 1932.  M. E. LONG  1,840,238
FILM DEVELOPING MACHINE
Filed Jan. 22, 1930  5 Sheets-Sheet 2
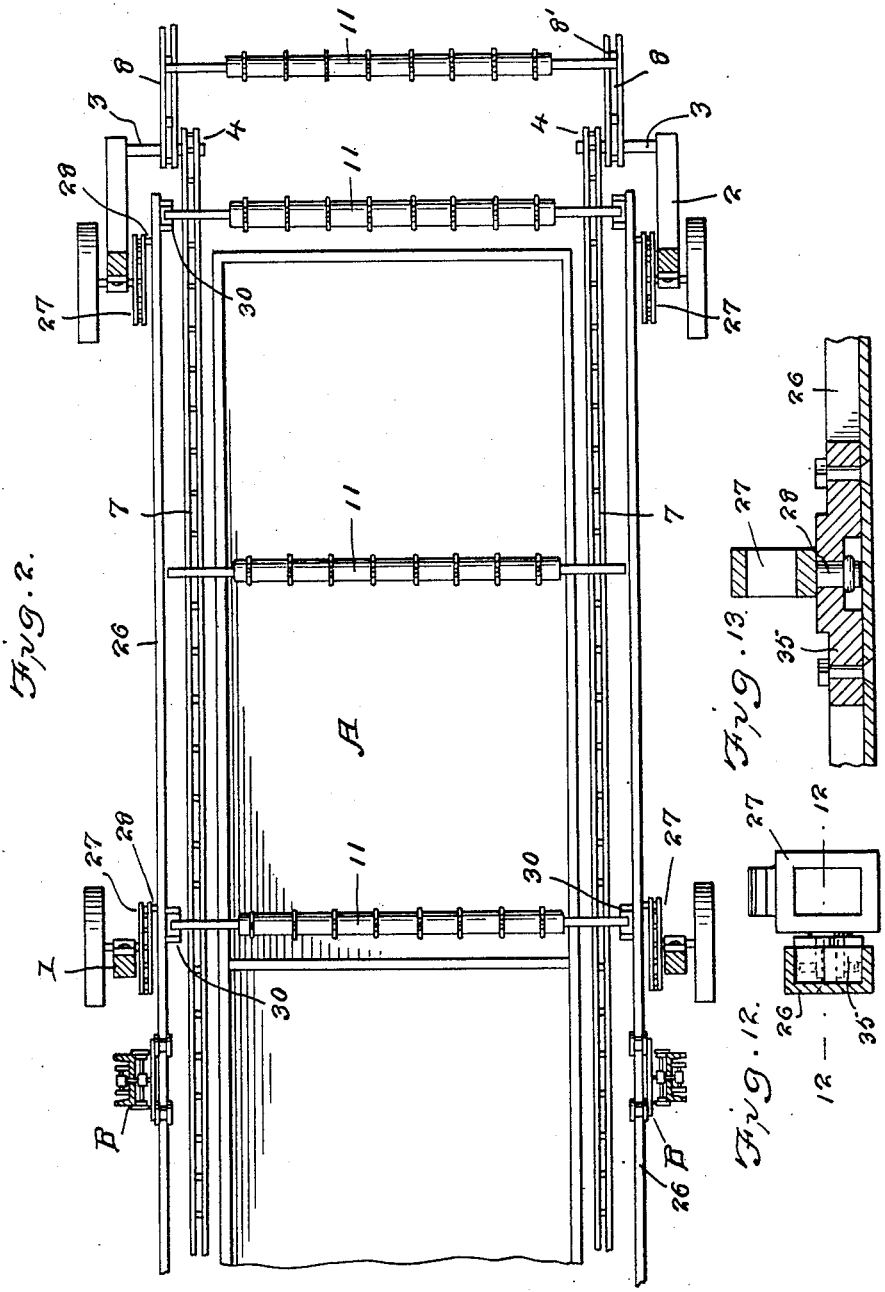
Millard E. Long INVENTOR
BY Victor J. Evans ATTORNEY

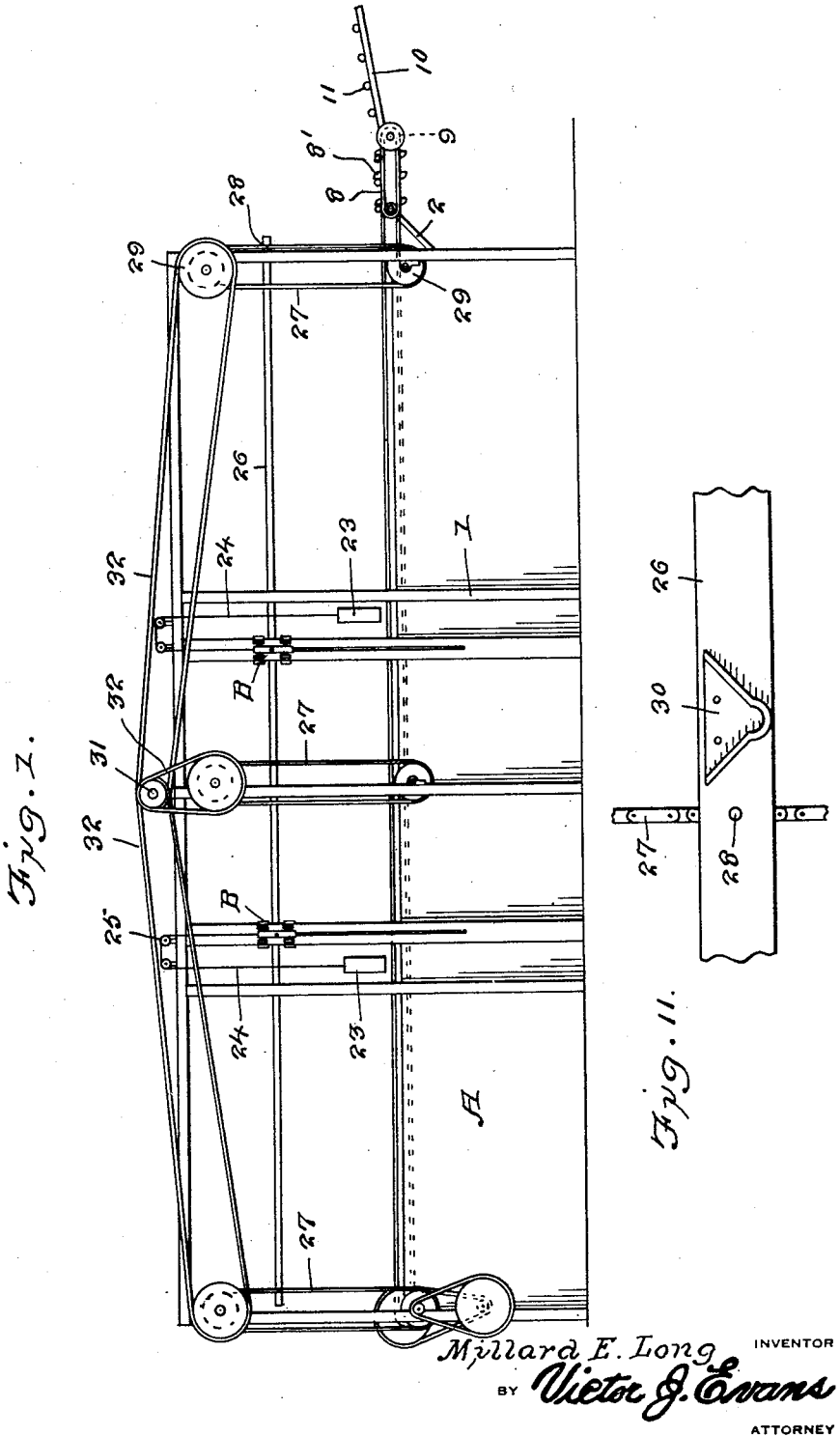

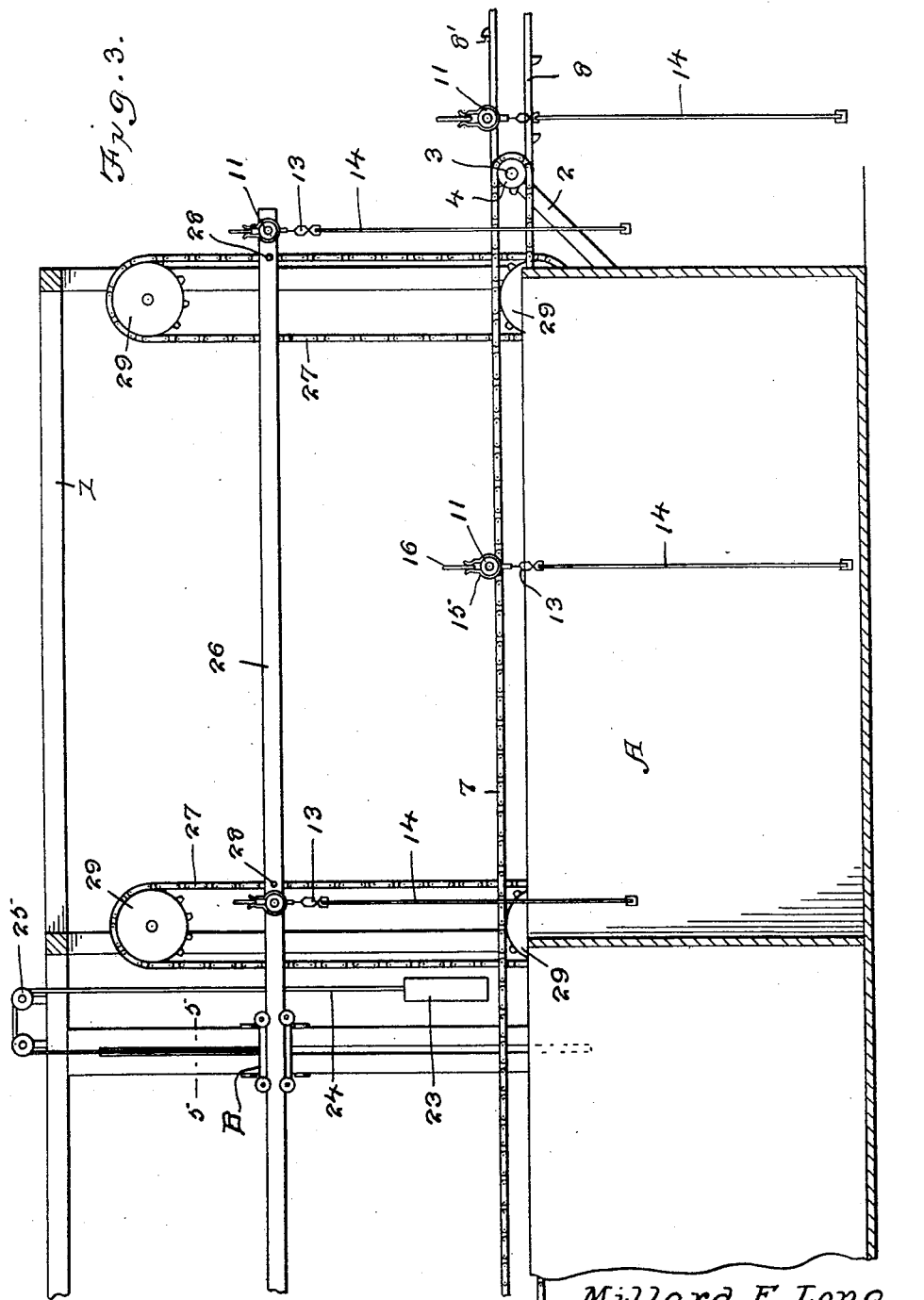

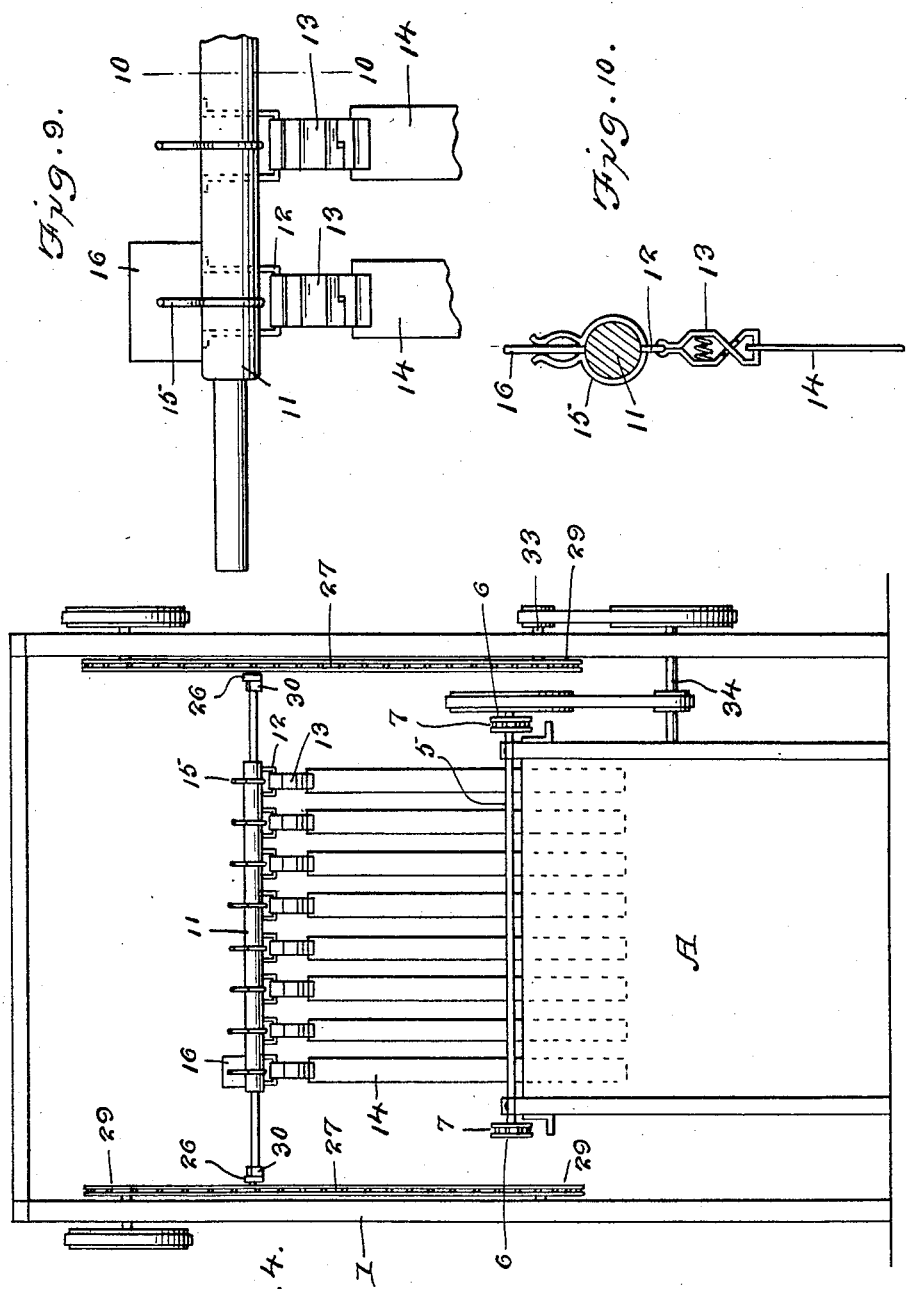

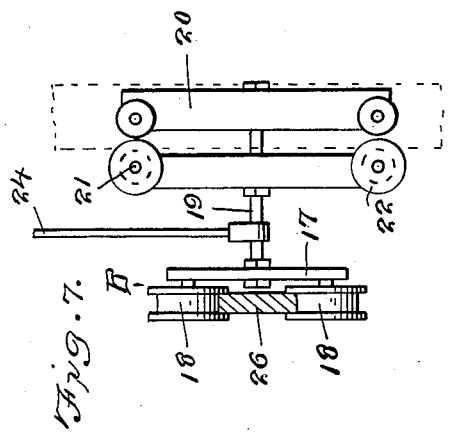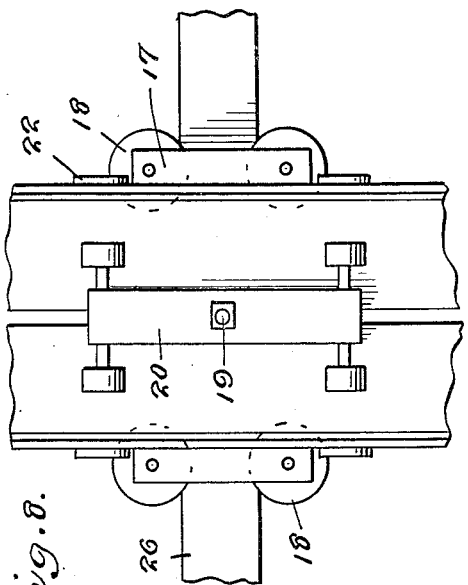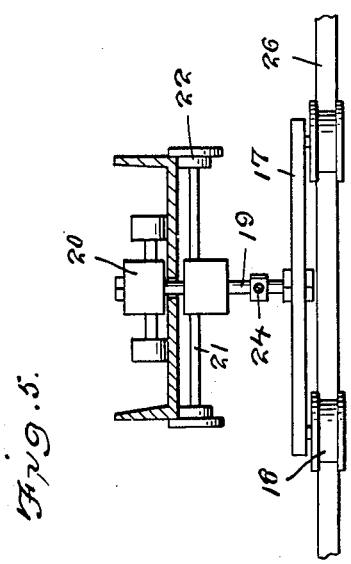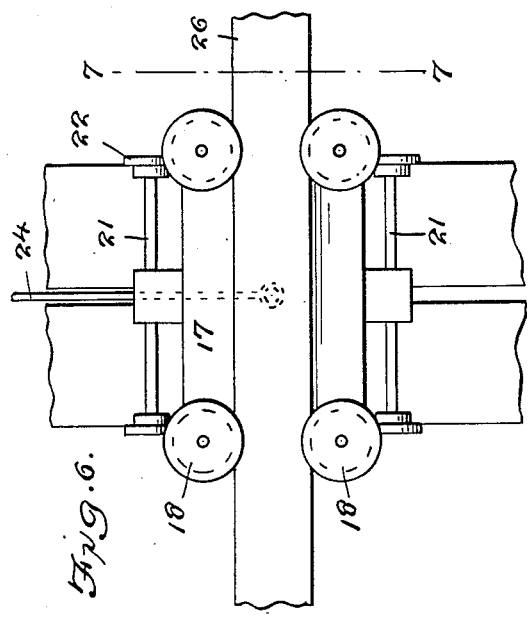

Patented Jan. 5, 1932

1,840,238

UNITED STATES PATENT OFFICE

MILLARD E. LONG, OF SAN ANTONIO, TEXAS, ASSIGNOR TO CARL D. NEWTON, OF SAN ANTONIO, TEXAS

FILM DEVELOPING MACHINE

Application filed January 22, 1930. Serial No. 422,649.

This invention relates to a film developing machine, the general object of the invention being to provide means for detachably connecting the films to bars and conveying the bars over tanks so that the films will be caused to pass through suitable solutions in the tanks to develop, fix and wash the films suspended from the bars, with means for raising the bars to lift the films over the ends of the tanks and then lowering the bars to immerse the films in the solutions in the tanks.

Thus this invention will quickly develop a great number of films with practically no attention on the part of the operator other than the placing of the films on the bars and their removal therefrom, and the preparation and care of the baths.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation of the apparatus.
Figure 2 is a plan view thereof.
Figure 3 is a vertical sectional view through the front part of the apparatus.
Figure 4 is an end view.
Figure 5 is a section on line 5—5 of Figure 3.
Figure 6 is a front view of Figure 5.
Figure 7 is a section on line 7—7 of Figure 6.
Figure 8 is a rear view of Figure 5.
Figure 9 is a fragmentary view of one of the film supporting parts, showing how the films are attached thereto.
Figure 10 is a section on line 10—10 of Figure 9.
Figure 11 is a detail view showing a socket member on the lifting and lowering bar.
Figure 12 is a sectional view showing how horizontal bars are pivoted to the chains.
Figure 13 is a section on line 13—13 of Figure 12.

In these drawings, the numeral 1 indicates a framework placed at each side of the tanks A which contain the developing, fixing and washing liquids. An extension 2 at the front end of each framework carries a stationary shaft 3 which supports a pair of sprockets 4. A shaft 5 is supported at the top of the rear end of the last tank and carries the sprockets 6. A chain 7 passes over each sprocket 6 and a sprocket 4 on each shaft 3, these parts being so arranged that the upper reach of each chain is located above the upper edge of the side of the row of tanks and is slightly spaced from the side of the row. Of course, the intermediate portions of the chains can be suitably supported, if necessary.

Chains 8 pass over the other pair of sprockets 4 on the shafts 3 and over the sprockets 9 which are suitably supported at the front end of the apparatus, and said chains are formed with the projections 8'. Inclined guides 10 deliver the bars 11 to the conveyor 8 by gravity, so that the bars are engaged by the projections 8' and are thus carried to the chains 7 which convey the bars 11 over the tops of the tanks. The bars 11 are of circular shape in cross section and have their ends reduced. Staples 12 are driven through each bar and depend therefrom and clamps 13 are attached to the staples, these clamps engaging the ends of the films 14 so that the films hang from the bars, as shown. Clamping rings 15 encircle each bar, the rings passing through the staples and having their jaws extending upwardly from the bars. These jaws are adapted to hold the envelopes 16 for the films or other identifying means for the films can be used.

Carriages B are supported for vertical movement on some of the uprights of the frames 1, these uprights being preferably of channel form. Each carriage comprises a plate 17 having a roller 18 at each corner thereof, a shaft 19 connected with the center of the plate and extending through a slot in the upright, with a pair of cross heads 20 on the shaft, one in front and the other in rear of the upright and the shafts 21 carried by each cross head. Each shaft carries the rollers 22, the rollers of the front shafts being flanged and engaging the corners of the upright, as shown in Figure 5, so as to prevent side play of the carriage and the rollers of the rear shafts engaging the rear face of the upright. The plate 17 may be pivoted on the shaft 19 so as to permit the plate to turn. A counterweight 23 is attached to each carriage by a cable 24 which passes over suitable guiding pulleys 25. A bar 26 passes between the rollers 18 of the carriages on each side of the tanks and this bar is of a length substantially equal to the length of the row of tanks. Each bar 26 is pivoted to the endless chains 27, as shown at 28. These chains are vertically arranged and pass over the upper and lower sprockets 29 carried by the frames 1. Thus the chains will act to raise and lower the bars 26 and as the pivotal points 28 pass around the sprockets, the bars will be given a reciprocatory motion. The carriages move with the vertical movement of the bars and the rollers 18 permit the longitudinal movements of the bars. The counterweights act to counterbalance the weight of the bars and the carriages and thus relieve the chains from undue strain, and a consequent reduction in power required.

Each bar 26 is spaced outwardly from a chain 7 and carries on its inner face a number of socket members 30 for engaging the ends of the film carrying bars 11 so as to lift said bars 11 over the ends of the tanks, as the bars 26 are moved upwardly by the chains 27 so that the films will clear the ends of the tanks and then the bars 26 are lowered by the chains to again place the carrying bars back upon the chains 7 with the films immersed in the liquid in the tank. As the pivotal points 28 pass under the lower sprockets 29, the socket members will disengage the ends of the film carrying bars so as to not interfere with the forward movement of the film carrying bars by the chains 7.

The parts can be driven in any suitable manner, but the drawings show a power shaft 31 belted to the shafts of the upper sprockets 29, as shown at 32, and the shaft 33 of the lower sprocket 29 at the rear of the apparatus belted to a shaft 34 which in turn is belted to the shaft 5. Thus all the parts are driven from the shaft 31.

From the foregoing it will be seen that the bars carrying the films will pass down the guides 10 and be carried by the conveyors 8 upon the chains 7. These chains will move the bars to the front end of the first tank so that the first bar will be lifted by a pair of the socket members 30 on the bars 26. This upward movement of the film carrying bar will enable the films to clear the front end of the first tank and then, as the pivotal points 28 pass over the upper sprockets 29, the film carrying bar will be moved over the front end of the tank so that the films will be suspended above the liquid therein. As the bars 26 move downwardly, the films will enter the liquid and finally the sockets 30 will deposit the ends of the film carrying bars upon the chains 7 and pass from under the ends of the bars so that the chains 7 can move the film carrying bars toward the end of the tank and thus permit the liquid to act on the films to develop the same. At the end of the first tank, the film carrying bar is again lifted to cause the films to clear the end of the tank and then the film carrying bar is lowered to place the films in the next tank and to permit the chains 7 to move the films through the next tank. Of course, the parts must be so timed as to their movements as to properly carry out the complete operation of the apparatus. This invention will develop, fix and wash a great number of films with but little attention on the part of the operator, as the operation is practically automatic.

By having the ends of the film carrying bars reduced, the socket members can pick up a bar without interference from another bar and by having the front plates of the carriages pivoted to their shafts, the bars 26 can be tilted without danger of damaging the parts.

The bars 26 are pivotally connected with the chains by the pins 28 which are formed with or connected to certain links of the chains, each pin passing through a hole in a recessed bracket 35 which is fastened to the bar 26, said bar 26 being of channel shape with the bracket fitting in the same. The nut or other fastening means on the free end of the pin is located in the recess, as shown in Figures 12 and 13. Thus the bars 26 are securely fastened to the chains without interfering with their pivotal movement. This manner of connecting the bars with the chains permits the bars to be placed in an angular position and the bars will be raised and lowered by the chains while in said angular position.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A film developing apparatus comprising a row of tanks for containing various liquids, bars having clamps thereon for engaging the ends of the films, conveyor means at the sides of the row of tanks for conveying the bars over the tanks with the films in the liquid therein, socket carrying members at the sides of the row of tanks, the sockets of which are adapted to engage the ends of the bars, means for giving said members an up and down motion and a reciprocatory motion at the ends of the vertical motions whereby the film carrying bars are lifted by the sockets to cause the films to clear the ends of the tanks and then lowered to place the films in a succeeding tank with the bars again engaging the conveyors, gravity means for feeding the bars upon the front ends of the conveyor means, vertically movable carriages having rollers thereon between which the socket carrying bars pass and counterweights connected with the carriages.

2. A film developing apparatus comprising a row of tanks, conveyor means arranged at the sides of the row at the top thereof, film carrying bars having their end portions resting upon the conveyor means whereby the bars are conveyed over the tanks, a framework at each side of the row, including upright members, carriages vertically movable on some of said members, each carriage including a pivoted plate with a roller at each corner thereof, a horizontal bar passing between the rollers of the carriages at each side of the row of tanks, endless chains, upper and lower sprockets over which each chain passes, means for pivotally connecting the horizontal bars to the chains whereby each bar is given an up and down motion as well as a reciprocatory motion as the pivotal points pass around the sprockets, socket members carried by the horizontal bars and engaging the ends of the film carrying bars to raise and lower the bars over the ends of adjacent tanks and means for imparting motion to the conveyor means and the endless chains.

3. A film developing apparatus comprising a row of tanks, conveyor means arranged at the sides of the row at the top thereof, film carrying bars having their end portions resting upon the conveyor means whereby the bars are conveyed over the tanks, a framework at each side of the row, including upright members, carriages vertically movable on some of said members, each carriage including a pivoted plate with a roller at each corner thereof, a horizontal bar passing between the rollers of the carriages at each side of the row of tanks, endless chains, upper and lower sprockets over which each chain passes, means for pivotally connecting the horizontal bars to the chains whereby each bar is given an up and down motion as well as a reciprocatory motion as the pivotal points pass around the sprockets, socket members carried by the horizontal bars and engaging the ends of the film carrying bars to raise and lower the bars over the ends of adjacent tanks, means for imparting motion to the conveyor means and the endless chains and counterweights connected with the carriages.

4. A film developing apparatus comprising a row of tanks, a frame at each side thereof, film carrying bars, means for conveying the bars horizontally over the top of the row, horizontal bars at the sides of the row and spaced outwardly from the conveying means, socket members on the bars for engaging the ends of the film carrying bars, vertically arranged endless members to which the horizontal bars are pivoted, whereby the bars are given an up and down movement and a reciprocatory motion at the ends of the vertical motions, means for imparting motion to the endless members and vertically movable carriages for supporting the horizontal bars, each carriage comprising a shaft passing through a slot in a vertical part of the frame, a plate pivoted to the shaft, a roller at each corner of the plate, the rollers engaging the upper and lower edges of the horizontal bar, cross heads carried by the shaft and rollers carried by the shafts, the rollers of one cross head engaging the rear face of the upright and the rollers of the other cross head being flanged and engaging the corners of the other face of the upright.

In testimony whereof I affix my signature.

MILLARD E. LONG.